(12) United States Patent
Shen et al.

(10) Patent No.: US 10,289,443 B2
(45) Date of Patent: May 14, 2019

(54) SYSTEM AND METHOD FOR SHARING GLOBAL TRANSACTION IDENTIFIER (GTRID) IN A TRANSACTIONAL MIDDLEWARE ENVIRONMENT

(71) Applicant: Oracle International Corporation, Redwood Shores, CA (US)

(72) Inventors: Xugang Shen, Beijing (CN); Qingsheng Zhang, Beijing (CN); Todd J. Little, Palatine (IL)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 458 days.

(21) Appl. No.: 13/829,176

(22) Filed: Mar. 14, 2013

(65) Prior Publication Data

US 2013/0246569 A1     Sep. 19, 2013

Related U.S. Application Data

(60) Provisional application No. 61/612,144, filed on Mar. 16, 2012.

(51) Int. Cl.
*G06F 17/30*     (2006.01)
*G06F 9/46*     (2006.01)
(Continued)

(52) U.S. Cl.
CPC ............ *G06F 9/466* (2013.01); *G06F 3/0659* (2013.01); *G06F 9/544* (2013.01); *G06F 9/546* (2013.01);
(Continued)

(58) Field of Classification Search
None
See application file for complete search history.

(56) References Cited

U.S. PATENT DOCUMENTS

| 5,261,089 A | 11/1993 | Coleman et al. |
| 5,452,445 A | 9/1995 | Hallmark et al. |

(Continued)

FOREIGN PATENT DOCUMENTS

| CN | 101438248 A | 5/2009 |
| CN | 102203779 A | 9/2011 |
| CN | 102317913 A | 1/2012 |

OTHER PUBLICATIONS

Rezende et al., "Implementing Identifiers for Nested Transactions," 1996 (Year: 1996).*

(Continued)

*Primary Examiner* — Usmaan Saeed
*Assistant Examiner* — Yu Zhao
(74) *Attorney, Agent, or Firm* — Tucker Ellis LLP (57) ABSTRACT

A system and method can support a tightly-coupled global transaction. One or more transaction servers operate to span the global transaction with a plurality of branches across a plurality of transaction domains, wherein each said branch is associated with an individual branch qualifier, and each said transaction domain is associated with a different global transaction identifier (GTRID). Furthermore, the transaction servers can configure the plurality of branches in the global transaction to share a common global transaction identifier (ID), and associate a composite branch qualifier with at least one branch of the global transaction in a transaction domain, wherein the composite branch qualifier includes a global transaction identifier (GTRID) that is associated with the transaction domain and an individual branch qualifier that is associated with the at least one branch.

20 Claims, 10 Drawing Sheets

(51) Int. Cl.
  *G06F 9/54* (2006.01)
  *G06F 15/167* (2006.01)
  *H04L 29/08* (2006.01)
  *G06F 3/06* (2006.01)

(52) U.S. Cl.
  CPC ...... *G06F 15/167* (2013.01); *G06F 17/30289* (2013.01); *H04L 67/02* (2013.01); *H04L 67/10* (2013.01)

(56) References Cited

U.S. PATENT DOCUMENTS

| | | | |
|---|---|---|---|
| 5,555,396 A | | 9/1996 | Alferness et al. |
| 5,617,537 A | | 4/1997 | Yamada et al. |
| 5,652,885 A | | 7/1997 | Reed |
| 5,680,610 A | | 10/1997 | Smith |
| 5,790,789 A | * | 8/1998 | Suarez ............... G06F 9/5055 709/202 |
| 6,070,202 A | | 5/2000 | Minkoff et al. |
| 6,154,847 A | | 11/2000 | Schofield et al. |
| 6,247,023 B1 | | 6/2001 | Hsiao |
| 6,295,548 B1 | | 9/2001 | Klein |
| 6,374,243 B1 | | 4/2002 | Kobayashi |
| 6,470,342 B1 | * | 10/2002 | Gondi ............... G06F 9/466 |
| 6,629,153 B1 | | 9/2003 | Gupta |
| 6,754,842 B2 | | 6/2004 | Kettley et al. |
| 7,103,597 B2 | | 9/2006 | McGoveran |
| 7,284,018 B1 | | 10/2007 | Waldorf |
| 7,380,155 B2 | | 5/2008 | Fung et al. |
| 7,430,740 B1 | | 9/2008 | Molloy et al. |
| 7,694,178 B2 | | 4/2010 | Hobson |
| 7,725,446 B2 | | 5/2010 | Huras |
| 7,743,036 B2 | | 6/2010 | Cotner et al. |
| 7,822,727 B1 | | 10/2010 | Shaughnessy |
| 7,913,261 B2 | | 3/2011 | Mitchell et al. |
| 7,970,737 B2 | | 6/2011 | Parkinson |
| 8,671,085 B2 | | 3/2014 | Dhamankar et al. |
| 8,738,964 B2 | | 5/2014 | Markus |
| 8,868,506 B1 | | 10/2014 | Bhargava et al. |
| 9,146,944 B2 | | 9/2015 | Parkinson |
| 2001/0047436 A1 | | 11/2001 | Sexton et al. |
| 2002/0023129 A1 | | 2/2002 | Hsiao et al. |
| 2002/0116568 A1 | | 8/2002 | Oksanen |
| 2002/0144006 A1 | | 10/2002 | Cranston et al. |
| 2003/0005172 A1 | | 1/2003 | Chessell |
| 2003/0035372 A1 | | 2/2003 | Schaub |
| 2003/0154423 A1 | | 8/2003 | Egolf |
| 2004/0015079 A1 | | 1/2004 | Berger et al. |
| 2004/0123293 A1 | * | 6/2004 | Johnson ............... 718/101 |
| 2004/0153349 A1 | | 8/2004 | K et al. |
| 2004/0153450 A1 | | 8/2004 | K et al. |
| 2004/0158549 A1 | | 8/2004 | Matena et al. |
| 2005/0044551 A1 | | 2/2005 | Sodhi |
| 2005/0144171 A1 | * | 6/2005 | Robinson ............... 707/9 |
| 2005/0144299 A1 | | 6/2005 | Blevins |
| 2005/0182795 A1 | | 8/2005 | Murthy |
| 2005/0262055 A1 | | 11/2005 | Newport |
| 2005/0262077 A1 | | 11/2005 | Barnes |
| 2006/0010026 A1 | | 1/2006 | Nenov |
| 2006/0075277 A1 | | 4/2006 | Johnson et al. |
| 2006/0080668 A1 | | 4/2006 | Blackmore et al. |
| 2006/0136887 A1 | | 6/2006 | Kaczynski et al. |
| 2006/0149791 A1 | | 7/2006 | Sinha et al. |
| 2006/0179125 A1 | | 8/2006 | Pavlik et al. |
| 2006/0235853 A1 | | 10/2006 | Luo |
| 2007/0041392 A1 | | 2/2007 | Kunze et al. |
| 2007/0079077 A1 | | 4/2007 | Baines et al. |
| 2007/0156729 A1 | | 7/2007 | Shaylor |
| 2007/0165625 A1 | | 7/2007 | Eisner |
| 2008/0127219 A1 | | 5/2008 | Lacombe et al. |
| 2008/0147945 A1 | | 6/2008 | Zimmer |
| 2008/0177955 A1 | | 7/2008 | Su |
| 2008/0243865 A1 | * | 10/2008 | Hu et al. ............... 707/10 |
| 2008/0250074 A1 | | 10/2008 | Parkinson |
| 2008/0307088 A1 | | 12/2008 | Chen |
| 2009/0070330 A1 | | 3/2009 | Hwang et al. |
| 2009/0158397 A1 | | 6/2009 | Herzog et al. |
| 2009/0172153 A1 | | 7/2009 | Cohen |
| 2009/0248765 A1 | | 10/2009 | Akidau et al. |
| 2009/0292744 A1 | | 11/2009 | Matsumura |
| 2010/0042999 A1 | | 2/2010 | Dorai et al. |
| 2010/0169284 A1 | | 7/2010 | Walter et al. |
| 2010/0198920 A1 | | 8/2010 | Wong et al. |
| 2011/0055313 A1 | | 3/2011 | Little |
| 2011/0087633 A1 | | 4/2011 | Kreuder et al. |
| 2011/0145204 A1 | | 6/2011 | Maple et al. |
| 2012/0084274 A1 | | 4/2012 | Renkes et al. |
| 2012/0131285 A1 | | 5/2012 | Leshchiner et al. |
| 2012/0166889 A1 | | 6/2012 | El-Kersh et al. |
| 2012/0210094 A1 | | 8/2012 | Blocksome et al. |
| 2013/0066949 A1 | | 3/2013 | Colrain |

OTHER PUBLICATIONS

Oracle, "Managing Distributed Transactions," Jun. 2001 (Year: 2001).*
Oracle, "Using GTRID Mapping in Transactions," 2000 (Year: 2000).*
Hirotaka Taruzawa, Takakiyo Tanaka, Aim! J2EE Architect Mission Critical Systems Development Course, Monthly Java World, Japan, Tokyo: IDG Japan, Apr. 1, 2005, vol. 9 No. 4 (Serial No. 95), pp. 130-141.
Yoshihiro Iwamiya, Shigeru Urushibara, 3. Art to Support Distributed Transaction Processing, Basic Knowledge 4 for SE, Distributed-Transaction Processing 1st Edition, Tokyo : Co. Ltd. RIC Telecom, Apr. 20, 1994, 1st Edition, pp. 84-91, 228, 262-263, ISBN4-89797-056-3.
State Intellectutal Property Office of the People's Republic of China, Office Action dated Dec. 23, 2016 for Chinese Patent Application No. 201380008047.6, 10 Pages.
State Intellectual Property Office of the People's Republic of China, Office Action dated Dec. 26, 2016 for Chinese Patent Application No. 201380008052.7, 12 Pages.
United States Patent and Trademark Office, Office Action dated Jul. 24, 2017 for U.S. Appl. No. 13/829,246, 45 Pages.

* cited by examiner

SYSTEM AND METHOD FOR SHARING GLOBAL TRANSACTION IDENTIFIER (GTRID) IN A TRANSACTIONAL MIDDLEWARE ENVIRONMENT

CLAIM OF PRIORITY

This application claims priority on U.S. Provisional Patent Application No. 61/612,144, entitled "SYSTEM AND METHOD FOR PROVIDING DISTRIBUTED TRANSACTION PROCESSOR DATABASE AFFINITY AND DISTRIBUTED TRANSACTION PROCESS OPTIMIZATION," by inventors Todd Little, Edward A. Heeren, Paul Parkinson, Carol L. Colrain, Nancy Ikeda, Peizhi Shi, Right Lv, Jim Jin and Xugang Shen, filed Mar. 16, 2012, which application is herein incorporated by reference.

CROSS REFERENCE TO RELATED APPLICATIONS

This application is related to the following patent applications, each of which is hereby incorporated by reference in its entirety:

U.S. Patent Application entitled "SYSTEM AND METHOD FOR SUPPORTING READ-ONLY OPTIMIZATION IN A TRANSACTIONAL MIDDLEWARE ENVIRONMENT," application Ser. No. 13/828,906, filed Mar. 14, 2013; and U.S. Patent Application entitled "SYSTEM AND METHOD FOR SUPPORTING APPLICATION INTEROPERATION IN A TRANSACTIONAL MIDDLEWARE ENVIRONMENT," application Ser. No. 13/829,246, filed Mar. 14, 2013.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems and software such as middleware, and is particularly related to transactional middleware.

BACKGROUND

A transactional middleware system, or transaction oriented middleware, includes enterprise application servers that can process various transactions within an organization. With the developments in new technologies such as high performance network and multiprocessor computers, there is a need to further improve the performance of transactional middleware. These are the generally areas that embodiments of the invention are intended to address.

SUMMARY

Systems and methods are provided for supporting a tightly-coupled global transaction. One or more transaction servers operate to span the global transaction with a plurality of branches across a plurality of transaction domains, wherein each said branch is associated with an individual branch qualifier, and each said transaction domain is associated with a different global transaction identifier (GTRID). Furthermore, the transaction servers can configure the plurality of branches in the global transaction to share a common global transaction identifier (ID), and associate a composite branch qualifier with at least one branch of the global transaction in a transaction domain, wherein the composite branch qualifier includes a global transaction identifier (GTRID) that is associated with the transaction domain and an individual branch qualifier that is associated with the at least one branch.

Other objects and advantages of the present invention will become apparent to those skilled in the art from the following detailed description of the various embodiments, when read in light of the accompanying drawings.

DETAILED DESCRIPTION

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the invention as following uses the OracleTuxedo® environment as an example for a transactional middleware machine environment. It will be apparent to those skilled in the art that other types of transactional middleware machine environments can be used without limitation.

Described herein are systems and methods that can support read-only optimization in a transactional middleware environment.

Global Transaction

In accordance with various embodiments of the invention, a transactional system can support a global transaction, which can be executed on more than one server, and is capable of accessing data from more than one resource manager.

A global transaction can be treated as a specific sequence of operations that are characterized by the four properties of atomicity, consistency, isolation, and durability (ACID). The global transaction can be a logical unit of work that has the following features:

All portions either succeed or have no effect.
Operations are performed that correctly transform the resources from one consistent state to another.
Intermediate results are not accessible to other transactions, although other processes in the same transaction may access the data.
All effects of a completed sequence cannot be altered by any kind of failure.

Furthermore, a global transaction may include several local transactions, each accessing a single resource manager. A local transaction can access a single database or file and can be controlled by the resource manager responsible for performing concurrency control and atomicity of updates at that distinct database. A given local transaction may be either successful or unsuccessful in completing its access.

Figure 1:
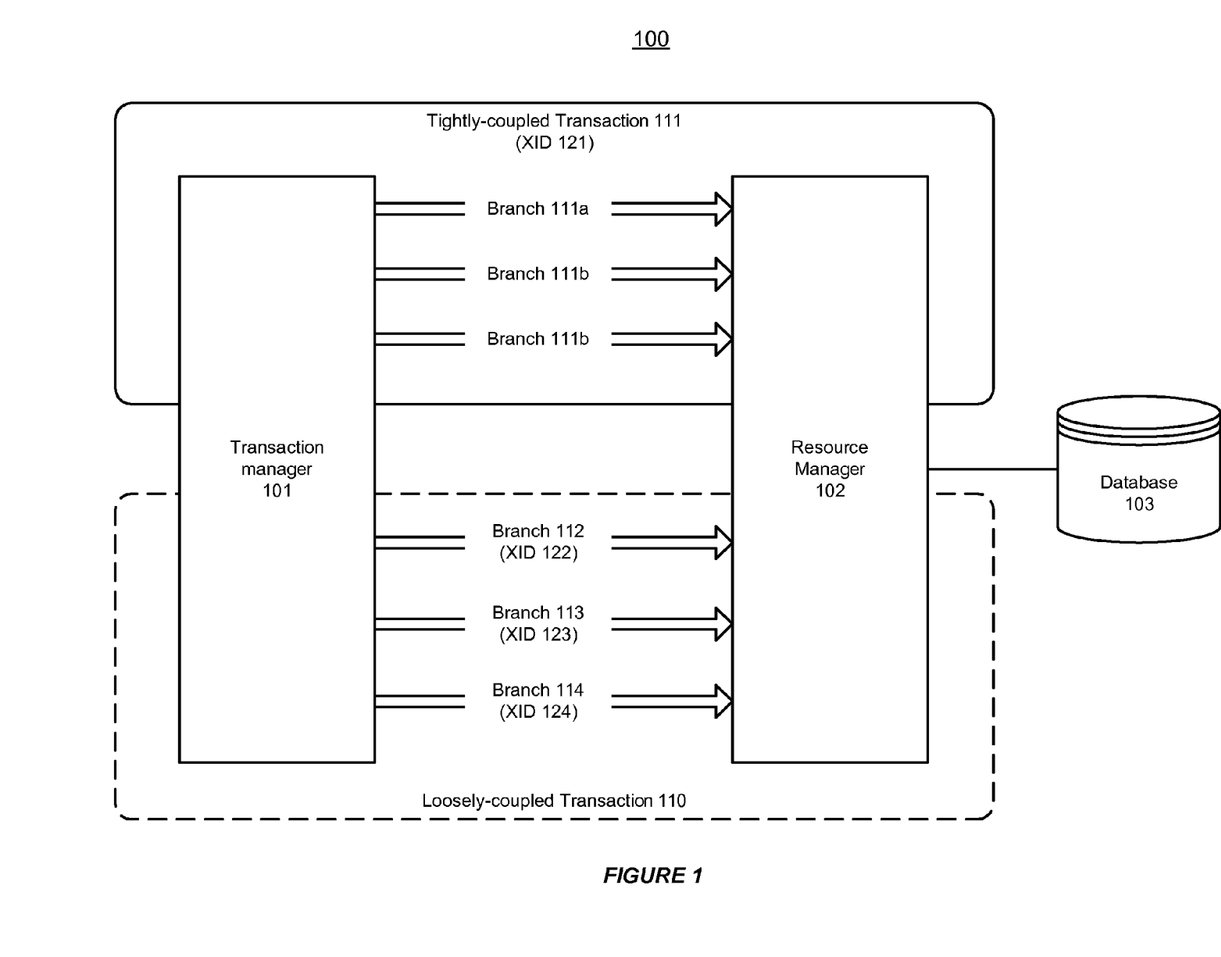
FIG. 1 shows an illustration of supporting different types of transactions in a transactional middleware machine environment, in accordance with an embodiment of the invention.

FIG. 1 shows an illustration of supporting different types of transactions in a transactional middleware machine environment, in accordance with an embodiment of the invention. As shown in FIG. 1, a transactional environment 100 can include a transaction manager (TM) 101, a resource manager (RM) 102, and a database 103.

Furthermore, the transactional environment 100 can support one or more transactions. Using the Open Group Distributed Transaction Processing (DTP) Model, the transaction manager (TM) 101 can construct transaction trees for various transactions with either tightly-coupled or loosely-coupled relationships with a resource manager (RM) 102. The coupling of the relationships can be determined in the way that the local services are defined, e.g. in the DMCONFIG file for the Oracle Tuxedo system.

As shown in FIG. 1, the transaction Manager (TM) can define either a tightly-coupled transaction 111 or a loosely-coupled transaction 110 in the transactional environment 100.

The tightly-coupled transaction 111 can include a plurality of transaction branches, e.g. branches 111a-111c, each of which can have the same transaction identifier (XID) 121. The common XID 121 can be used by all processes participating in the same global transaction 111 and accessing the same resource manager (RM) 102.

This tightly-coupled relationship can maximize data sharing between processes. For example, XA-compliant RMs can share locks for resources used by processes having the same XID. Additionally, the Tuxedo system can achieve the tightly-coupled relationship through the group concept. In Tuxedo, the work done by a group on behalf of a given global transaction belongs to the same transaction branch, and all the processes can be given with the same XID.

On the other hand, the loosely-coupled transaction 110 can include a plurality of transaction branches, e.g. branches 112-114, each of which can have a different transaction identifier (XID). As shown in FIG. 1, branch 112 can have a XID 122, branch 113 can have a XID 123, and branch 114 can have a XID 124.

The TM 101 can generate a transaction branch for each part of the work in support of the global transaction. For example, a loosely-coupled relationship can be created in the Tuxedo system when each group participating in the same global transaction defines a transaction branch.

The resource manager (RM) 102 can handle each transaction branch in the loosely-coupled transaction 110 separately, and there is no sharing of data or of locks between the transaction branches. Furthermore, deadlocks, which may result in the rollback of the global transaction, can occur between the transaction branches in the loosely-coupled transaction 110.

Two-Phase Commit (2PC)

A two-phase-commit (2PC) protocol can be used to execute a transaction, such as a loosely-coupled global transaction. The two-phase-commit protocol (2PC) can include a prepare phase and a commit phase. In the prepare phase, a coordinating transaction manager (TM) instructs the participating resource managers (RMs) to take the necessary steps for either committing or aborting the transaction. In the commit phase, the transaction manager (TM) decides whether to commit or abort the transaction, based on the results of the prepare phase.

Figure 2:
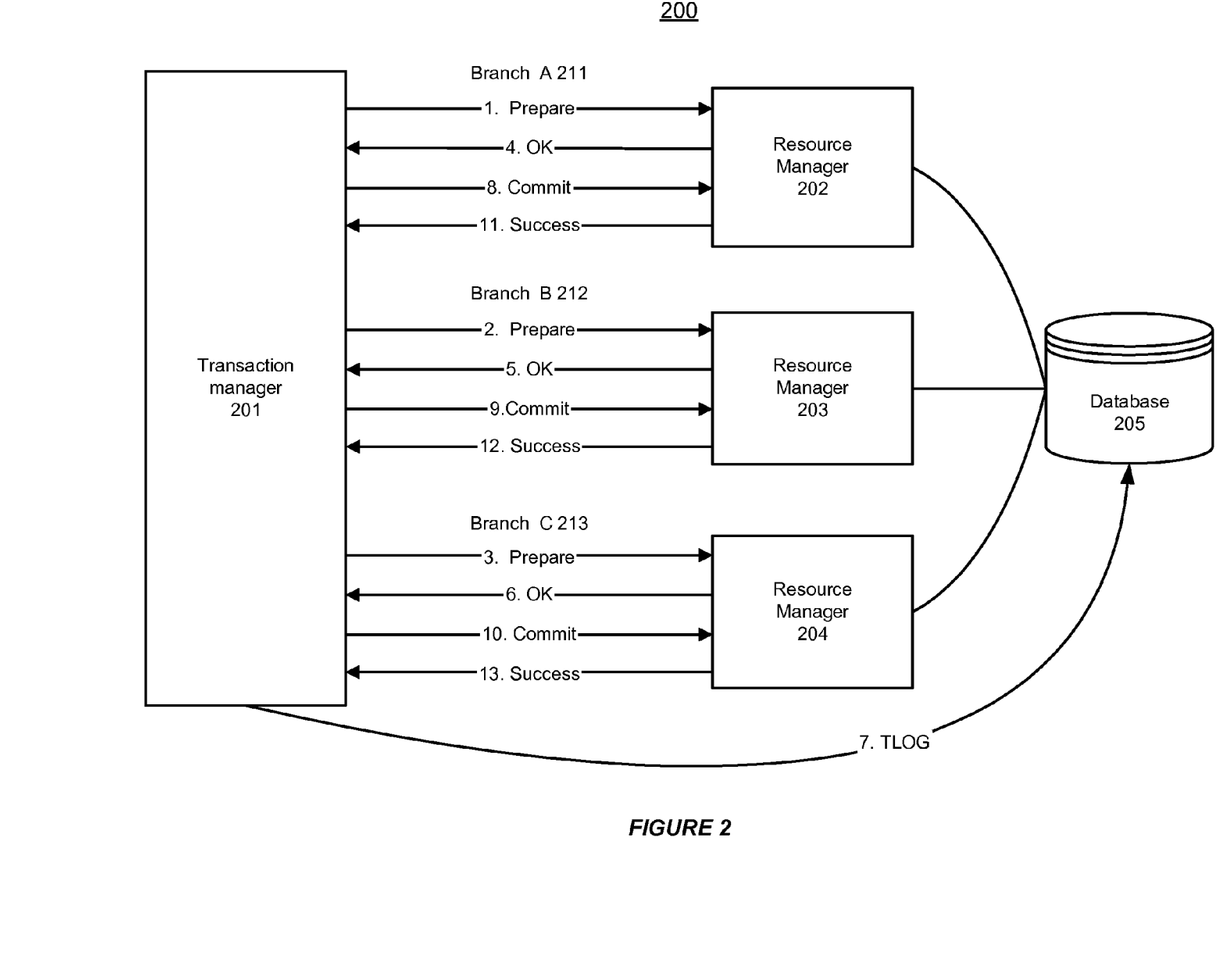
FIG. 2 shows an illustration of supporting two-phase commit in a transactional middleware machine environment.

FIG. 2 shows an illustration of supporting two-phase commit in a transactional middleware machine environment. As shown in FIG. 2, a transactional environment 200 can include a transaction manager 201 that supports the execution of various transactions, and one or more resource managers 202-204 that manage one or more data source, e.g. a database 205.

For example, the transaction manager 201 can execute a transaction that involves transaction branch A 211, transaction branch B 212, and transaction branch C 213, each of which can be executed against a resource manager 202-204 respectively. If any branch fails in the transaction, the transaction manager 201 can help the resource manager 202-204 decide whether to commit, or roll back, the transaction.

As shown in FIG. 2, the transaction manager 201 can send a prepare instruction to the resource manager 202-204 on all three branches (steps 1, 2, and 3). After the resource managers 202-204 return an "OK" vote (steps 4, 5 and 6), the transaction manager 201 can write a transaction log to the database 205 (step 7).

The transaction log (TLOG) may be written either to files, or to a database, so that the transaction manager 201 can have enough information to recover the transaction if any branch fails during the commit phase.

Then, the transaction manager 201 can instruct the resource manager 202-204 to commit all three branches (steps 8, 9 and 10). The resource manager 202-204 can inform the transaction manager 201 after successfully completing the commit phase (steps 11, 12 and 13).

Read-Only Optimization

In accordance with an embodiment of the invention, a read-only optimization can be used to improve the performance of a transactional system without sacrificing the ACID properties of the transaction. The read-only optimization can reduce the phases involved in executing a transaction and can eliminate the transaction log (TLOG).

Figure 3:
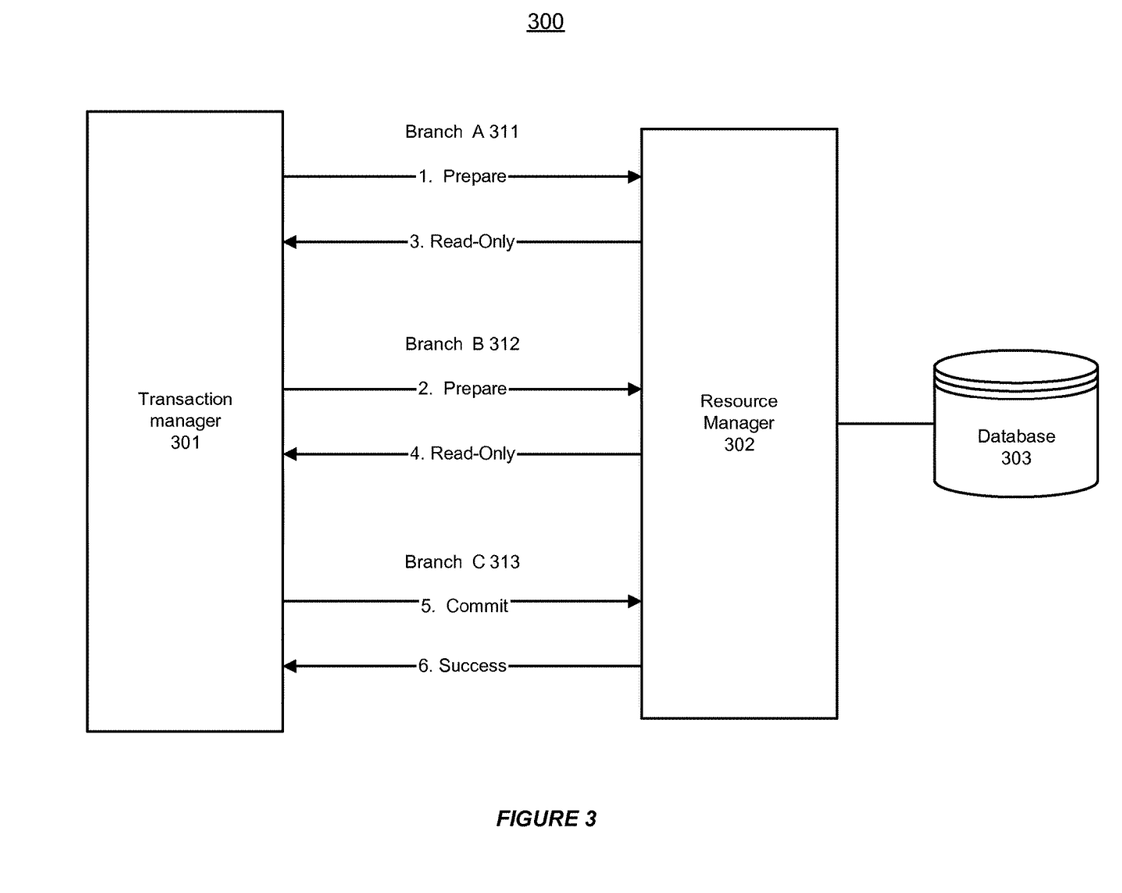
FIG. 3 shows an illustration of supporting read-only optimization in a transactional middleware machine environment, in accordance with an embodiment of the invention.

FIG. 3 shows an illustration of supporting read-only optimization in a transactional middleware machine environment, in accordance with an embodiment of the invention. As shown in FIG. 3, a transactional environment 300 can include a transaction manager (TM) 301, a resource manager (RM) 302, and a database 303

The transaction manager 301 can execute a transaction that involves transaction branch A 311, transaction branch B 312, and transaction branch C 313, each of which can be executed against a resource manager 302 that manage one or more data source, e.g. a database 303.

In accordance with an embodiment of the invention, using the read-only optimization, the transaction manager 301 can withhold one branch during the prepare phase. As shown in FIG. 3, the transaction manager 301 can invoke a prepare operation on the branches A-B 311-312 of the transaction with the branch C 313 on hold (steps 1-2).

The transaction manager 301 can randomly pick a branch form the branches A-C 311-313 to hold. Alternatively, the transaction manager 301 can decide to hold a branch that can perform the fastest execution.

Furthermore, when each of these transaction branches A-B 311-312 returns a "Read-Only" vote (steps 3-4), the transaction manager 301 can invoke a commit operation on the branch C 313 directly (step 5), without invoking a prepare operation and/or writing a TLOG.

The "Read-Only" vote returned by the resource manager 302 indicates that no data on the branches has been modified. The transaction manager 301 can safely assume that the branches A-B 311-312 are completed and that no commit operations on the branches are necessary for this transaction.

Additionally, the transaction manager 301 can save a state of the branch C 313 to the database 303 while committing the branch C 313 (step 5). Thus, if the commit fails, the transaction manager 301 can recover the transaction by rolling back the branch C 313.

Using the read-only optimization, the system can improve the performance of a transaction by eliminating the TLOG. Furthermore, as shown in FIG. 3, the system can save a commit operation on the branches A-B 311-312, and a prepare operation on the branch C 313.

Many Tuxedo applications uses on-line transaction process (OLTP), which runs on the same RM (one instance or more) and can taking advantage of the read-only optimization in a database, such as an Oracle Database. For a global transaction involving more than one Tuxedo group, Tuxedo can automatically hold one transaction branch which can be performed the fastest and do prepare stage on the other branches. If, and only if, all the other branches return a Read-only vote, Tuxedo can perform a commit operation directly on the branch on hold, without writing a TLOG and performing a prepare operation.

Figure 4:
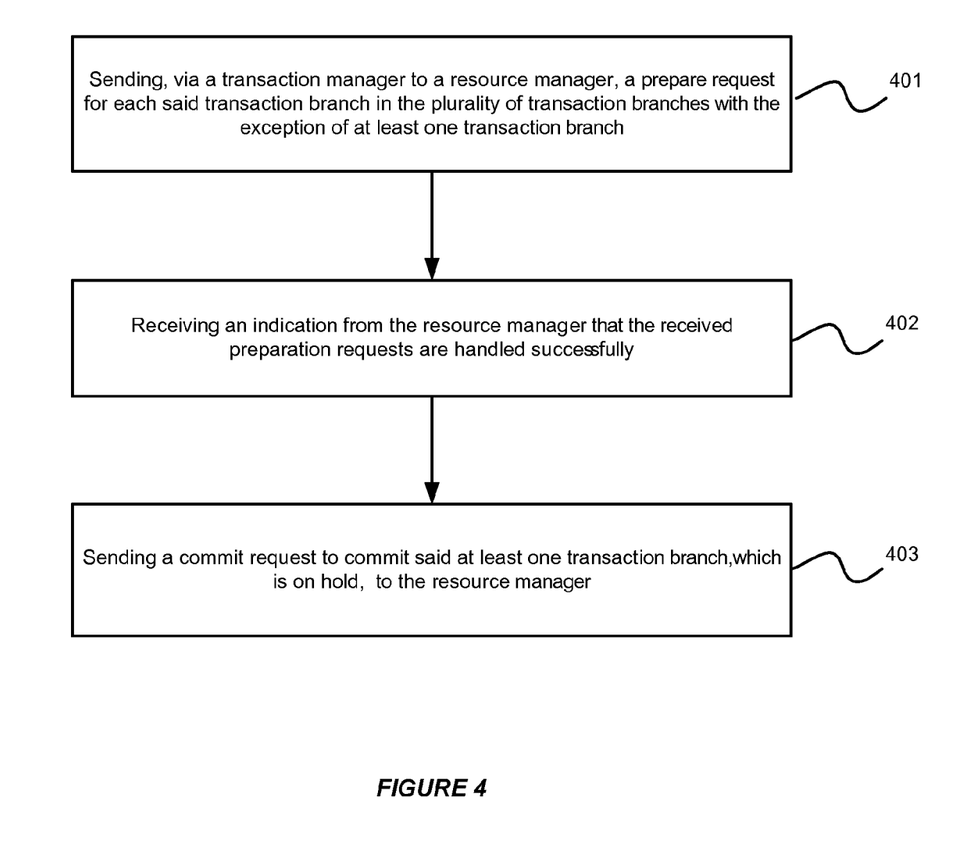
FIG. 4 illustrates an exemplary flow chart for supporting read-only optimization in a transactional middleware machine environment, in accordance with an embodiment of the invention.

FIG. 4 illustrates an exemplary flow chart for supporting read-only optimization in a transactional middleware machine environment, in accordance with an embodiment of the invention. As shown in FIG. 4, at step 401, a transaction manager can send, to a resource manager, a prepare request for each said transaction branch in the plurality of transaction branches with the exception of at least one transaction branch. Then, at step 402, the transaction manager can receive an indication from the resource manager that the received preparation requests are handled successfully. Furthermore, at step 403, the transaction manager can send a commit request to the resource manager to commit the at least one transaction branch, which is on hold.

Figure 5:
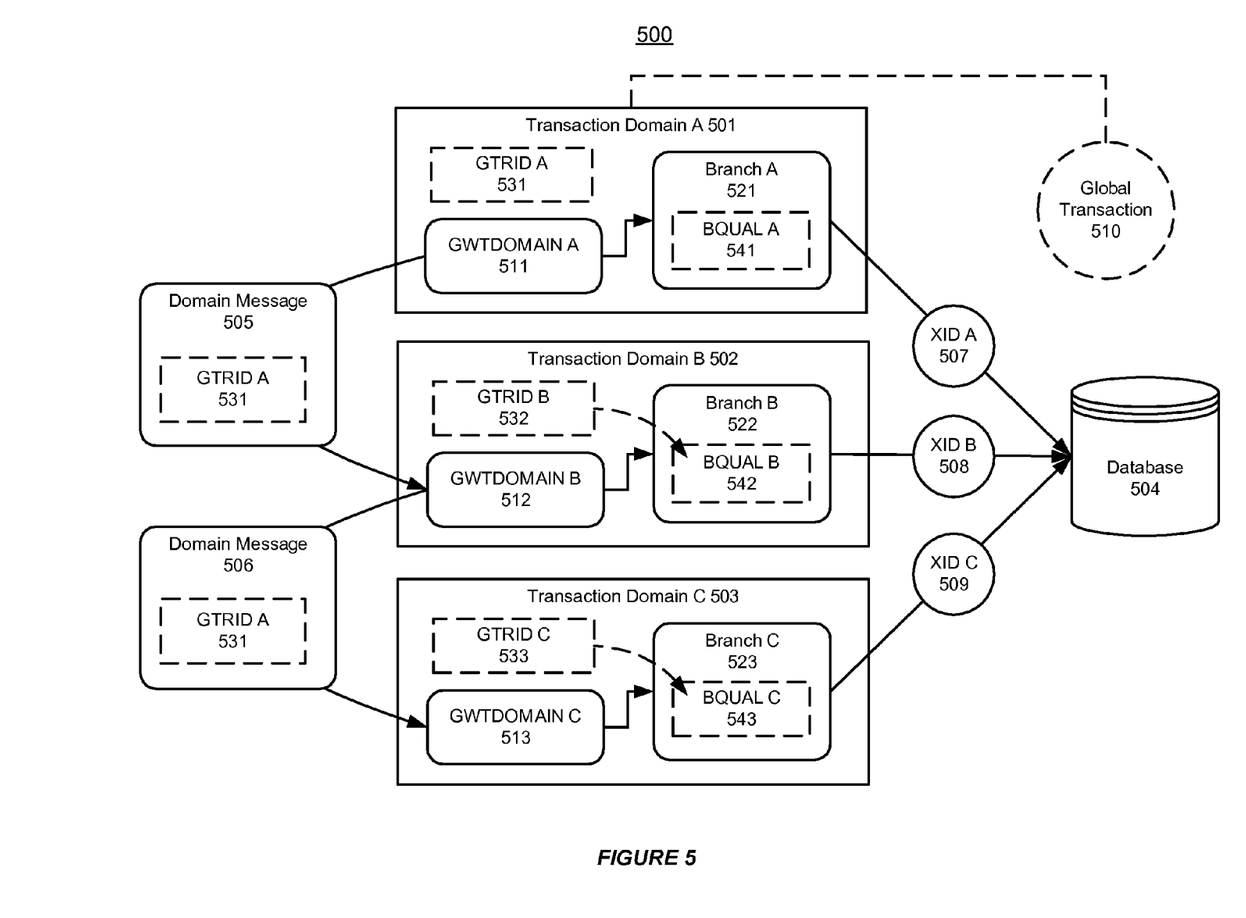
FIG. 5 shows an illustration of sharing common global transaction identifier (GTRID) across multiple transaction domains in a transactional middleware machine environment, in accordance with an embodiment of the invention.

Common Global Transaction Identifier (GTRID) Across Multiple Transaction Domains FIG. 5 shows an illustration of sharing common global transaction identifier (GTRID) across multiple transaction domains in a transactional middleware machine environment, in accordance with an embodiment of the invention. As shown in FIG. 5, a global transaction 510 in the transactional middleware machine environment 500 can include a plurality of branches, e.g. branches A-C 521-523, each of which can be associated with a branch qualifier (BQUAL), e.g. BQUALs A-C 541-543.

The global transaction 510 can span across multiple transaction domains A-C 501-503, each of which can be associated with a separate global transaction identifier (GTRID). For example, GTRID A 531 is associated with the branch A 521 in the transaction domain A 501, GTRID B 532 is associated with the branch B 522 in the transaction domain B 502, and GTRID C 533 is associated with the branch C 523 in the transaction domain C 503.

Furthermore, a database 504 can be used to store various types of transactional information in the global transaction 510. In order to support the interaction with the database 504 (or an associated resource manager), the system can generate a transaction identifier (XID) for each branch in the global transaction 510. For example, the system can generate XID A 507 for branch A 521, XID B 508 for branch A 522, and XID C 509 for branch C 523. Each transaction identifier (XID) can include a global transaction identifier (GTRID) and a branch qualifier, and a format identifier (which will be discussed in the following sections).

In accordance with an embodiment of the invention, a "tightly-coupled relationship" can be established for the global transaction 510, where a common global transaction identifier (GTRID) and can be used by all processes or branches for both participating in the global transaction 510 and accessing the same resource manager. The tightly-coupled relationship can maximizes data sharing between the processes. In the example of Tuxedo, a tightly-coupling relationship can be achieved via the group concept. The work done by a group on behalf of a given global transaction belongs to the same transaction branch with all the processes are given the same XID.

In the example as shown in FIG. 5, GTRID A 531 can be chosen as the common global transaction identifier (GTRID), in the case when the transaction domain A 501 is the owner or initiator of the global transaction 510. Furthermore, GTRID A 531 can be sent from the transaction domain A 501 to other domains, such as transaction domains B-C 502-503, in order to establish the tightly-coupled relationship.

Additionally, the transaction identifiers (XIDs) A-C 507-509 can be generated to include GTRID A 531, in order to support the performance of the global transaction 510 on the database 504. Thus, the database 504 can identify the different branches A-C 521-523 in the global transaction 510 based on GTRID A 531, the common global transaction identifier (GTRID).

In accordance with an embodiment of the invention, a composite branch qualifier can be included in a generated transaction identifier (XID) to support the recovery of the global transaction 510 when it fails. For example, XID B 508 can include a composite branch qualifier that includes both BQUAL B 542 and GTRID B 532. Similarly, XID C 509 can include a composite branch qualifier that includes both BQUAL C 543 and GTRID C 533.

In accordance with an embodiment of the invention, the owner of the global transaction 510, e.g. domain A 501, can be configured to either enable or disable the use of the common global transaction identifier (GTRID), e.g. GTRID A 531. Then, domains B-C 502-503 can use GTRIDs B-C 532-533 instead of the Common GTRID A 531 for performing the global transaction 510. Accordingly, the transaction branches of the global transaction 510 are in loosely-coupled relationship and a two-phase commit can be used in processing the transaction.

Also as shown in FIG. 5, each transaction domain A-C 501-503 can include a gateway server, e.g. GWTDOMAINs A-C 511-513. These gateway servers 511-513 can be use to send or receive one or more domain messages 505-506, which can be used to propagate the common global transaction identifier (ID), GTRID A 531.

In the example of Tuxedo, a local TDomain can send out its GTRID, used on the resource manager, as an imported XID to a remote TDomain, via META_TCM. Additionally, the remote TDomain can check the imported XID in META_TCM. The XA operations on this global transaction in receiving TDomain use this imported GTRID, not the local GTRID, on the resource manager. Thus, the different branches of the transaction on these TDomains can be tightly coupled and the read-only optimization can be supported, when they are performed on same database.

Figure 6:
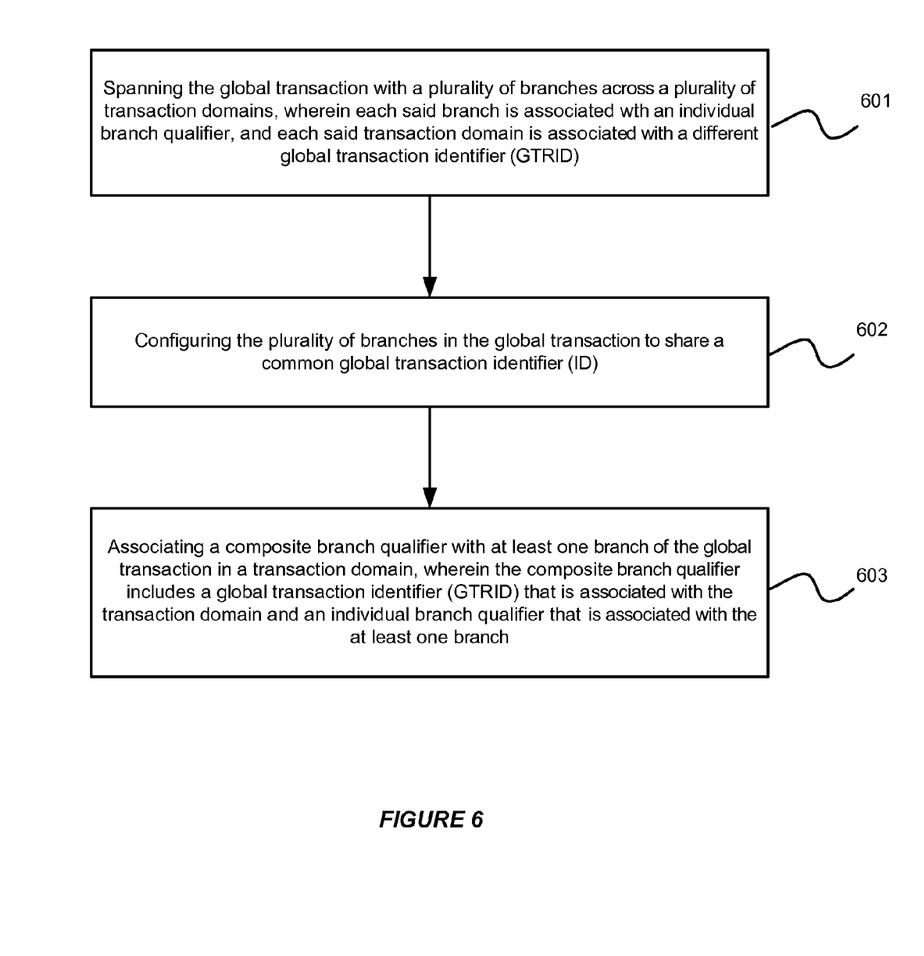
FIG. 6 illustrates an exemplary flow chart for sharing common global transaction identifier (GTRID) across multiple transaction domains in a transactional middleware machine environment, in accordance with an embodiment of the invention.

FIG. 6 illustrates an exemplary flow chart for sharing common global transaction identifier (GTRID) across multiple transaction domains in a transactional middleware machine environment, in accordance with an embodiment of the invention. As shown in FIG. 6, at step 601, the system can span the global transaction with a plurality of branches across a plurality of transaction domains, wherein each said branch is associated with an individual branch qualifier, and each said transaction domain is associated with a different global transaction identifier (GTRID). Then, at step 602, the system can configure the plurality of branches in the global transaction to share a common global transaction identifier (ID). Furthermore, at step 603, the system can associate a composite branch qualifier with at least one branch of the global transaction in a transaction domain, wherein the composite branch qualifier includes a global transaction identifier (GTRID) that is associated with the transaction domain and an individual branch qualifier that is associated with the at least one branch Application Interoperability Between Different Servers In accordance with an embodiment of the invention, format identifiers (FORMATIDs) can be used for providing application interoperability between different servers. For example, the format identifiers (FORMATIDs) can specify which server creates a global transaction identifier (GTRID).

Figure 7:
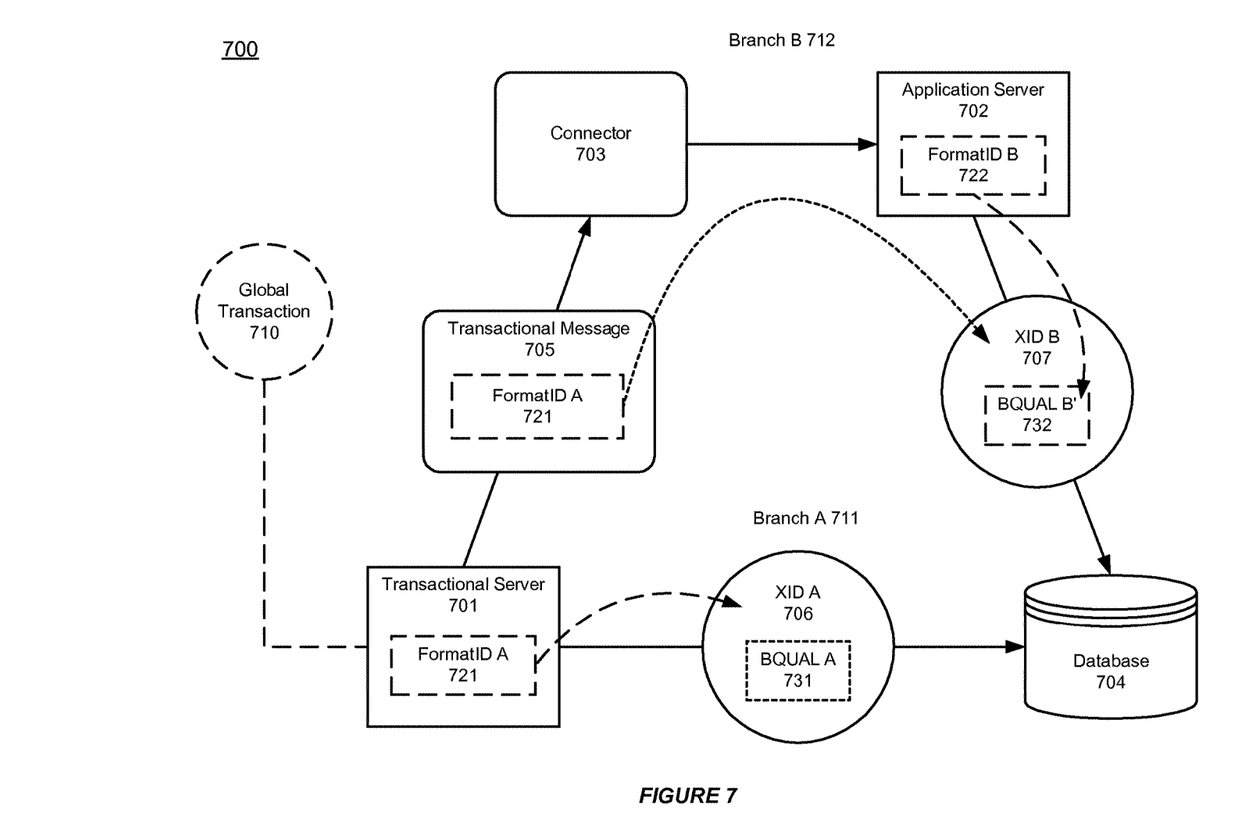
FIG. 7 shows an illustration of providing application interoperability between servers in a transactional middleware machine environment, in accordance with an embodiment of the invention.

FIG. 7 shows an illustration of providing application interoperability between different servers in a transactional middleware machine environment, in accordance with an embodiment of the invention. As shown in FIG. 7, the transactional middleware machine environment 700 can include a plurality of servers, e.g. a transactional server 701 and an application server 702. The transactional server 701 and the application server 702 can be associated with different format identifiers (FORMATIDs), e.g. FORMATID A 721 for the transaction server 701, and FORMATID B 722 for the application server 702.

The transaction server 701 can initiate a global transaction 710 with a plurality of transaction branches, e.g. branches A-B 711-712, each of which can be associated with an individual branch qualifier, e.g. BQUALs A-B 731-732.

Furthermore, both the branches A-B 711-712 can interact with the database 704. The database 704 can recognize each of the branches A-B 711-712 in the global transaction based on a generated transaction identifier (XID). For example, the transactional server 701 can generate the XID A 706 for the branch A 711 and the application server 702 can generate the XID B 707 for the branch B 712.

As shown in FIG. 7, in order to establish the tightly coupled relationship, the branches A-B 711-712 can share a common format identifier (FORMATID), e.g. FORMATID A 721, since the transaction server 701 is the owner of the global transaction 710. Thus, the database 704 can identify tightly-coupled relationship among the branches A-B 711-712 using FORMATID A 721 and a common global transaction identifier (ID), e.g. GTRID A 531 as shown in FIG. 5.

Additionally, the transaction server 701 can direct the branch B 712 to the application server 702, before interacting with the database 704. For example, the transaction server 701 can send the FORMATID A 721 to the application server 702 using a transaction message 705.

In accordance with an embodiment of the invention, a composite branch qualifier can be included in a generated transaction identifier (XID) to support the recovery of the global transaction 710 when it fails. In addition to the original branch qualifiers for the different transaction branches, the composite branch qualifier for branch B 712 can include additional information such as the FORMATID B 722 and related global transaction identifier (GTRID), e.g. GTRID B 532 as shown in FIG. 5.

As shown in FIG. 7, a connector 703 can provide interoperability between the transactional server 701 and the application server 702. The connector 703 can receive an imported FORMATID 721 from the transactional server 701, and provide the imported format ID, FORMATID A 721, to the application server 702.

For example, the WebLogic Tuxedo Connector provides interoperability between WebLogic Server applications and Tuxedo services. The connector allows WebLogic server clients to invoke Tuxedo services and Tuxedo clients to invoke WebLogic Server Enterprise Java Beans (EJBs) in response to a service request. Tuxedo can store its FORMATID into the first four bytes of the branch qualifier in order to let the transaction managers know which branch is owned by the WebLogic Server or Tuxedo server in the recover process.

Figure 8:
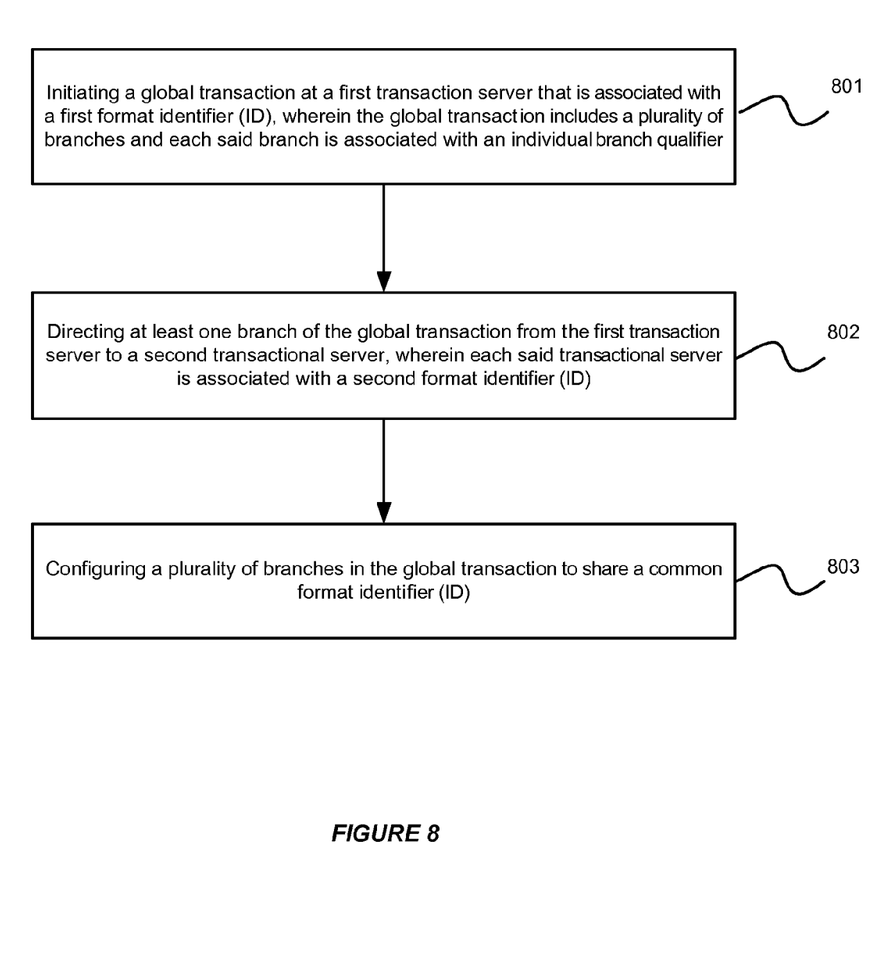
FIG. 8 illustrates an exemplary flow chart for providing application interoperability between servers in a transactional middleware machine environment, in accordance with an embodiment of the invention.

FIG. 8 illustrates an exemplary flow chart for providing application interoperability between servers in a transactional middleware machine environment, in accordance with an embodiment of the invention. As shown in FIG. 8, at step 801, the system can initiate a global transaction at a first transaction server that is associated with a first format identifier (ID), wherein the global transaction includes a plurality of branches and each said branch is associated with an individual branch qualifier. Then, at step 802, the system can direct at least one branch of the global transaction from the first transaction server to a second transactional server, wherein each said transactional server is associated with a second format identifier (ID). Furthermore, at step 803, the system can configure a plurality of branches in the global transaction to share a common format identifier (ID).

The Generating and Recovery of the Transaction Identifiers (XIDs)

Figure 9:
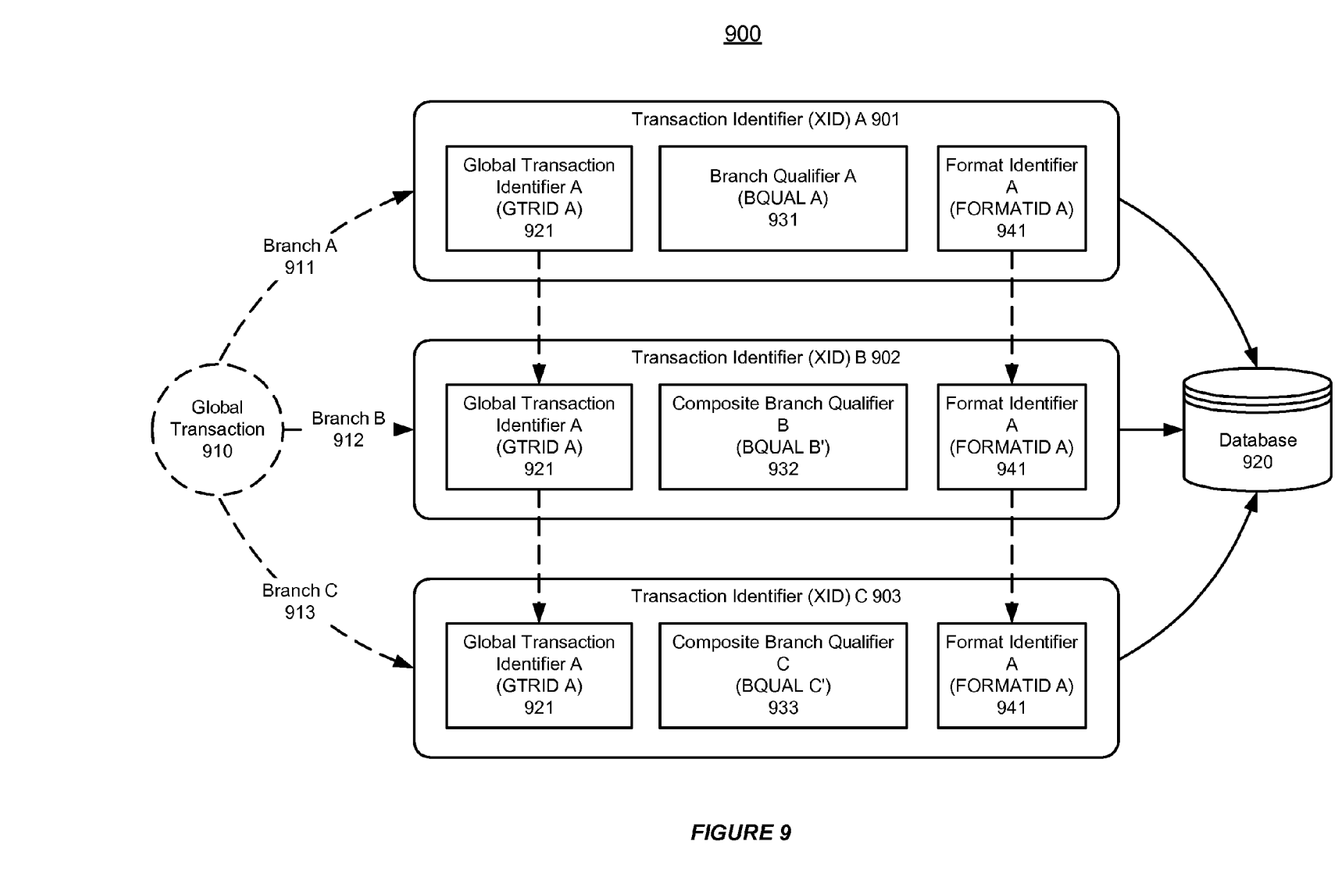
FIG. 9 shows an illustration of generating one or more transaction identifiers (XIDs) in a transactional middleware machine environment, in accordance with an embodiment of the invention.

FIG. 9 shows an illustration of generating one or more transaction identifiers (XIDs) in a transactional middleware machine environment, in accordance with an embodiment of the invention. As shown in FIG. 9, a global transaction 910 in a transactional environment 900 can include a plurality of tightly-coupled branches, e.g. branches A-C 911-913.

Furthermore, the system can generate the transaction identifiers (XIDs), e.g. XIDs A-C 901-903 for the global transaction 910, and store them in a database 920. Each of the XIDs A-C 901-903 can include GTRID A 921 and FORMATID A 941, which function as the common global transaction identifier (GTRID) and a common format identifier (FORMATID) respectively. Thus, the database 920 can recognize that the branches A-C 911-913 belong to the same global transaction 910.

Additionally, each transaction identifiers (XIDs), e.g. XIDs A-C 901-903, can include a branch qualifier. For example, branch A 911 can include the branch qualifier, BQUAL A 931, while the transaction identifier (XID) B 902 can include a composite branch qualifier, BQUAL B' 932, and the transaction identifier (XID) C 903 can include a composite branch qualifier, BQUAL C' 933. BQUAL B' 932 and BQUAL C' 933 can include additional information for supporting the recovery of the global transaction 910, such as the local GTRID.

Figure 10:
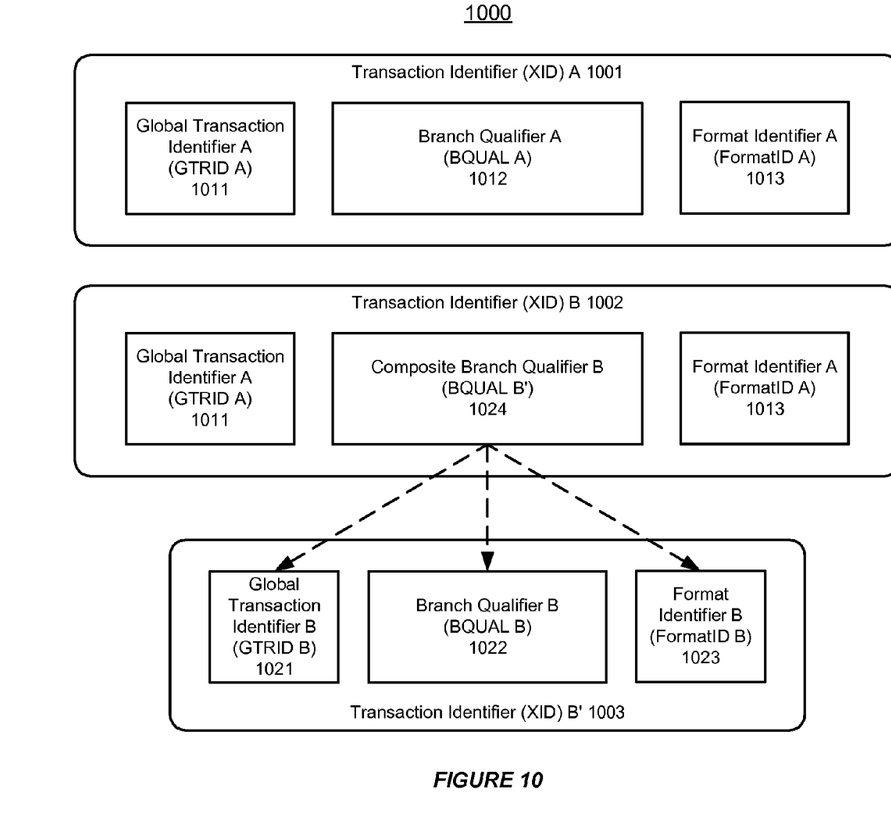
FIG. 10 shows an illustration of recovering a transaction in a transactional middleware machine environment, in accordance with an embodiment of the invention.

FIG. 10 shows an illustration of recovering a transaction in a transactional middleware machine environment, in accordance with an embodiment of the invention. As shown in FIG. 10, during the recover phase, a global transaction 1000 can be recovered based on one or more transaction identifier (XIDs), e.g. XIDs A-B 1001-1002.

The XID A 1001 is associated with the owner or initiator of the global transaction 1000. Thus, the GTRID A 1011, BQUAL A 1012, and FORMATID A 1013 can be retrieved directly from XID A 1001.

Furthermore, XID B 1002 can include the common GTRID A 1011, the common FORMATID A 1013, and a composite BQUAL B' 1024. As shown in FIG. 10, composite BQUAL B' 1024 includes the local GTRID B 1021, BQUAL B 1022, and FORMATID B 1023, each of which can be retrieved in order to recover the global transaction for the local branch.

Then, the transaction manager can continuingly process the global transaction 1000 using the local transaction IDs 1011-1013 and 1021-1023.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for supporting a global transaction, the method comprising:
spanning the global transaction across a first transaction branch and a second transaction branch, the first transaction branch and the second transaction branch respectively associated with a first transaction domain and a second transaction domain;
generating, at the first transaction domain, a first common global transaction identifier (GTRID);
sending the common GTRID to the second transaction domain;
generating at the second transaction domain a second GTRID;
associating the first branch with a first individual branch qualifier;
associating the second branch with a second individual branch qualifier;
associating a third branch qualifier that is a composite branch qualifier with the second branch, wherein the third composite branch qualifier includes:
the second GTRID,
and the second individual branch qualifier;
generating a first local transaction identifier (XID) for the first branch of the global transaction that includes:
the first common GTRID, and
the first individual branch qualifier;
generating a second local (XID) for the second branch of the global transaction, wherein the second local transaction identifier includes:
the first common GTRID, and
the third composite branch qualifier associated with the second branch;
using, by the first transaction branch and the second transaction branch the common GTRID included in the first XID and the second XID, respectively, to establish a tightly-coupled relationship for participating in the global transaction while accessing a same resource manager;
upon a failure of the global transaction, retrieving, by a transaction manager, the common GTRID and the first individual branch qualifier included in the first XID provided for the first transaction branch;
using, by the transaction manager, the retrieved common GTRID and the first individual branch qualifier to recover the global transaction for the first transaction branch by rolling back the first transaction branch;
upon the failure of the global transaction retrieving, by the transaction manager, the second GTRID and the second individual branch qualifier from the third composite branch qualifier included in the second XID provided for the second transaction branch; and
using, by the transaction manager, the retrieved second GTRID and the second individual branch qualifier to recover the global transaction for the second transaction branch by rolling back the second transaction branch.

2. The method of claim 1, wherein the first transaction domain is an owner of the global transaction, and further comprising:

enabling, by the owner of the global transaction, use of the first global transaction identifier as a common global transaction identifier.

3. The method of claim 1, wherein the same resource manager provides access to a database.

4. The method of claim 1, further comprising:
providing a gateway server for each said transaction domain.

5. The method of claim 4, further comprising:
sending and/or receiving one or more domain messages via the gateway servers, wherein at least one domain message includes the first common GTRID.

6. The method of claim 1, further comprising:
including, in the first local XID, a first format identifier.

7. The method of claim 3, further comprising:
storing the second local (XID) in a global transaction table in the database.

8. The method of claim 1, further comprising:
including, in the second local XID, a second format identifier.

9. The method of claim 8, wherein the second format identifier is included in the third composite branch qualifier.

10. The method of claim 1, further comprising:
enabling read-only optimization in processing the global transaction.

11. A system for supporting a tightly-coupled global transaction, comprising:
one or more microprocessors;
one or more transaction servers running on the one or more microprocessors, wherein said one or more transaction servers operate to:
span the global transaction across a first transaction branch and a second transaction branch, the first transaction branch and the second transaction branch respectively associated with a first transaction domain and a second transaction domain;
generate, at the first transaction domain, a first common global transaction identifier (GTRID);
send the common GTRID to the second transaction domain;
generate at the second transaction domain a second GTRID;
associate the first branch with a first individual branch qualifier;
associate the second branch with a second individual branch qualifier;
associate a third branch qualifier that is a composite branch qualifier with the second branch, wherein the third composite branch qualifier includes:
the second GTRID, and
the second individual branch qualifier;
generate a first local transaction identifier (XID) for the first branch of the global transaction that includes:
the first common GTRID, and
the first individual branch qualifier;
generate a second local (XID) for the second branch of the global transaction, wherein the second local transaction identifier includes:
the first common GTRID, and
the third composite branch qualifier associated with the second branch,
use, by the first transaction branch and the second transaction branch the common GTRID included in the first XID and the second XID, respectively, to establish a tightly-coupled relationship for participating in the global transaction while accessing a same resource manager;

upon a failure of the global transaction, retrieve, by a transaction manager, the common GTRID and the first individual branch qualifier included in the first XID provided for the first transaction branch;
use, by the transaction manager, the retrieved common GTRID and the first individual branch qualifier to recover the global transaction for the first transaction branch by rolling back the first transaction branch;
upon the failure of the global transaction retrieve, by the transaction manager, the second GTRID and the second individual branch qualifier from the third composite branch qualifier included in the second XID provided for the second transaction branch; and
use, by the transaction manager, the retrieved second GTRID and the second individual branch qualifier to recover the global transaction for the second transaction branch by rolling back the second transaction branch.

12. The system according to claim 11, wherein:
the first transaction domain is the owner of the global transaction; and
the owner of the global transaction enables use of the first global transaction identifier as a common global transaction identifier.

13. The system of claim 11, wherein the same resource manager provides access to a database.

14. The system of claim 13, wherein:
the second local (XID) is stored in a global transaction table in the database.

15. The system of claim 11, further comprising:
a gateway server in each said transaction domain.

16. The system of claim 15, wherein:
said one or more transaction servers operate to send and/or receive one or more domain messages via the gateway servers, wherein at least one domain message includes the first common GTRID.

17. The system of claim 11, wherein:
the first local XID includes a first format identifier.

18. The system of claim 11, wherein:
the second local XID includes a second format identifier.

19. The system of claim 18, wherein:
the second format identifier is included in the third composite branch qualifier.

20. A non-transitory machine readable storage medium having instructions stored thereon that when executed cause a system supporting a global transaction to:
span the global transaction across a first transaction branch and a second transaction branch, the first transaction branch and the second transaction branch respectively associated with a first transaction domain and a second transaction domain;
generate, at the first transaction domain, a first common global transaction identifier (GTRID);
send the common GTRID to the second transaction domain;
generate at the second transaction domain a second GTRID;
associate the first branch with a first individual branch qualifier;
associate the second branch with a second individual branch qualifier;
associate a third branch qualifier that is a composite branch qualifier with the second branch, wherein the third composite branch qualifier includes:
the second GTRID, and
the second individual branch qualifier;

generate a first local transaction identifier (XID) for the first branch of the global transaction that includes:
the first common GTRID, and
the first individual branch qualifier;
generate a second local (XID) for the second branch of the global transaction, wherein the second local transaction identifier includes:
the first common GTRID, and
the third composite branch qualifier associated with the second branch
use, by the first transaction branch and the second transaction branch the common GTRID included in the first XID and the second XID, respectively, to establish a tightly-coupled relationship for participating in the global transaction while accessing a same resource manager;
upon a failure of the global transaction, retrieve, by a transaction manager, the common GTRID and the first individual branch qualifier included in the first XID provided for the first transaction branch;
use, by the transaction manager, the retrieved common GTRID and the first individual branch qualifier to recover the global transaction for the first transaction branch by rolling back the first transaction branch;
upon the failure of the global transaction retrieve, by the transaction manager, the second GTRID and the second individual branch qualifier from the third composite branch qualifier included in the second XID provided for the second transaction branch; and
use, by the transaction manager, the retrieved second GTRID and the second individual branch qualifier to recover the global transaction for the second transaction branch by rolling back the second transaction branch.

\* \* \* \* \*

UNITED STATES PATENT AND TRADEMARK OFFICE
CERTIFICATE OF CORRECTION

PATENT NO. : 10,289,443 B2
APPLICATION NO. : 13/829176
DATED : May 14, 2019
INVENTOR(S) : Shen et al.

Page 1 of 1

It is certified that error appears in the above-identified patent and that said Letters Patent is hereby corrected as shown below:

On the Title Page

In Column 1, item (72), under Inventors, Line 3, delete "Palatine (IL)" and insert -- Palatine, IL (US) --, therefor.

In the Specification

In Column 5, Line 8, delete "303" and insert -- 303. --, therefor.

In Column 7, Line 43, delete "branch" and insert -- branch. --, therefor.

In Column 9, Line 60, delete "data" and insert -- data. --, therefor.

Signed and Sealed this
Twenty-first Day of July, 2020

Andrei Iancu
*Director of the United States Patent and Trademark Office*